United States Patent
Ozturk et al.

(10) Patent No.: US 8,380,777 B2
(45) Date of Patent: *Feb. 19, 2013

(54) NORMAL-BASIS TO CANONICAL-BASIS TRANSFORMATION FOR BINARY GALOIS-FIELDS GF($2^m$)

(75) Inventors: Erdinc Ozturk, Worcester, MA (US); Vinodh Gopal, Westboro, MA (US); Gilbert Wolrich, Framingham, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 1399 days.

This patent is subject to a terminal disclaimer.

(21) Appl. No.: 11/772,176

(22) Filed: Jun. 30, 2007

(65) Prior Publication Data

US 2009/0006512 A1  Jan. 1, 2009

(51) Int. Cl.
*G06F 7/72* (2006.01)
(52) U.S. Cl. ......................................................... 708/492
(58) Field of Classification Search .................... None
See application file for complete search history.

(56) References Cited

U.S. PATENT DOCUMENTS

| | | | |
|---|---|---|---|
| 7,299,253 B2 * | 11/2007 | Lambert | 708/492 |
| 7,346,641 B2 * | 3/2008 | Jin et al. | 708/492 |
| 2004/0098437 A1 * | 5/2004 | Jin et al. | 708/492 |
| 2005/0004966 A1 * | 1/2005 | Fan | 708/492 |
| 2008/0077645 A1 * | 3/2008 | Lambert | 708/492 |
| 2009/0006511 A1 * | 1/2009 | Ozturk et al. | 708/205 |
| 2009/0006512 A1 | 1/2009 | Ozturk et al. | |

OTHER PUBLICATIONS

Office Action from related matter 11/772,172, mailed Dec. 30, 2010.
Office Action from related matter 11/772,172, mailed Apr. 20, 2011.
Notice of Allowance from related matter 11/772,172, mailed Aug. 19, 2011.

* cited by examiner

*Primary Examiner* — David H Malzahn
(74) *Attorney, Agent, or Firm* — Grossman, Tucker, Perreault & Pfleger, PLLC

(57) ABSTRACT

Basis conversion from normal form to canonical form is provided for both generic polynomials and special irreducible polynomials in the form of "all ones", referred to as "all-ones-polynomials" (AOP). Generation and storing of large matrices is minimized by creating matrices on the fly, or by providing an alternate means of computing a result with minimal hardware extensions.

10 Claims, 7 Drawing Sheets

NORMAL-BASIS TO CANONICAL-BASIS TRANSFORMATION FOR BINARY GALOIS-FIELDS GF($2^m$)

FIELD

This disclosure relates to public key cryptography and in particular to use of polynomials in public key cryptography.

BACKGROUND

Public key cryptography is typically used for secure communications over the Internet, for example, to distribute secret keys used in cryptographic algorithms. Public key cryptography is also used in digital signatures to authenticate the origin of data and protect the integrity of that data. Commonly used public key algorithms include Rivert, Shamir, Aldeman (RSA) and Diffie-Hellman key exchange (DH). The public key algorithm may be used to authenticate keys for encryption algorithms such as the Data Encryption Standard (DES) and the Advanced Encryption Standard (AES).

RSA and DH provide security based on the use of number theory. RSA is based on factoring the product of two large prime numbers. DH is based on a discrete logarithm for finite groups. Typically, public key systems use 1024-bit parameters for RSA and DH.

The Elliptic Curve Cryptosystem (ECC) is a relatively new public key algorithm that is based on the arithmetic of elliptic curves. ECC provides the same level of security as RSA and DH but uses parameters having fewer bits than parameters used by RSA or DH. For example, 1024-bit parameters are recommended for the RSA and DS public key algorithms and 160-bit parameters are recommended for the ECC algorithm to authenticate an 80-bit key. 3072-bit parameters are recommended for the RSA and DS public key algorithms and 224-bit parameters are recommended for the ECC algorithm to protect a 128-bit key.

Elliptic curve cryptography (ECC) provides more security than traditional cryptosystems based on integer fields for much smaller key-sizes. It is very efficient from the perspectives of computes, power, storage and bandwidth to transmit keys. It scales much better than the traditional schemes and is therefore likely to gain more popularity with increased need for higher security strengths. Elliptic curves are algebraic/geometric objects that have been extensively studied by mathematicians. These curves can be applied to cryptography by suitably defining the underlying field and constraining the parameters such that the points on the curve form a Group (suggested in 1985 independently by Neil Koblitz and Victor Miller).

Elliptic curves for cryptographic applications are defined over prime fields (Galois Field Prime (GFP)) and binary fields (Galois Field Binary (GF2m)) GFP and GF2m both have a finite number of points that form a mathematical Group structure. The points can be operated on by special "addition" or "subtraction" operations. For any two points P1 and P2 in the group: P3=P1+P2 is defined. After point-addition has been defined, the basic building blocks of any cryptosystem are computations of the form Q=[k]P. The operation [k]P may be referred to as scalar point multiplication. This can be defined as P added to itself (k−1) times. Note that 1<=k<ord(P), where "ord" is defined as the order of the element of the group. Given P and [k]P, it is computationally infeasible to recover k.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
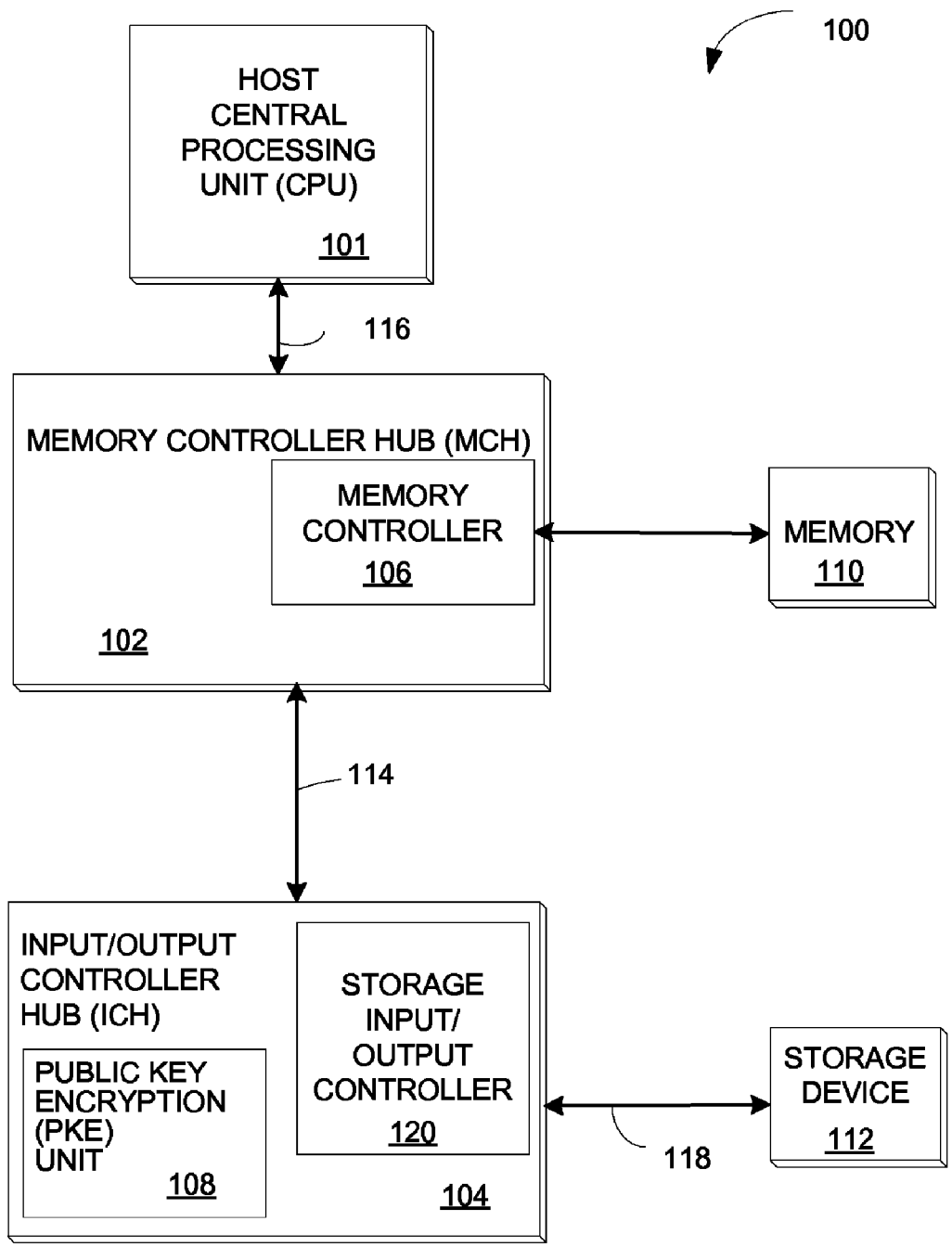
FIG. 1 is a block diagram of a system that includes an embodiment of a Public Key Encryption (PKE) unit.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The basis of a binary field specifies how the bit strings that make up the elements of the binary field are interpreted. Some known basis that are typically used in cryptography such as ECC are polynomial basis and normal basis.

The value of a binary representation is differs dependent on the representation used. For example, the 5-bit binary representation '11011' in normal representation, that is, starting at the leftmost bit (MSB) as the Least Significant bit (LSB), has a value of $1.\beta+1.\beta^{\wedge}(2^{\wedge}1)+0.\beta^{\wedge}(2^{\wedge}2)+1.\beta(2^{\wedge}3)+1.\beta(2^{\wedge}4)$. The same 5-bit binary representation '11011' in polynomial representation, that is, starting at the rightmost bit (LSB) as the Least Significant bit (LSB), has a value of $1.X^4+1.X^3+0.X^2+1\beta^1+1.X$. Thus, the conversion from normal basis to polynomial basis and polynomial basis to normal basis, involves changing the order of bits from 'left to right' to 'right to left' order.

A polynomial is an algebraic function of two or more summed terms, each term consisting of a constant multiplier and one or more variables raised, in general, to integral powers. Binary Galois Field GF($2^m$) multiplication is typically defined in polynomial basis (PB) representation. For example, using polynomial basis, the binary vector 1101 is interpreted as $1.X^3+1.X^2+0.X+1$, that is, $X^3+X^2+1$. Addition of field elements represented in polynomial basis is performed by bit-wise Exclusive ORing (XORing) the vector representations. For example, the result of adding ($X^3+X^2+1$) and ($X^3+X+1$) mod 2 is 0110 which is the result of a bit-wise XORing of '1101' and '1011'. Polynomial-basis (PB) representation may also be used for other computations, for example, computations of Cyclic Redundancy Check (CRC) and Reed-Solomon (RS)-based error-correcting codes. The advantage to polynomial-basis is that multiplication is relatively easy.

Normal-basis (NB) representation is an alternative to polynomial basis and has more complex multiplication but squaring is very simple. The normal basis representation needs specialized "normal-basis multipliers" that are very expensive to implement in hardware for generic irreducible polynomials. Furthermore, a normal-basis multiplier is optimal only when there is a dedicated normal-basis multiplier per polynomial. It is prohibitively expensive to implement dedicated normal-basis multipliers in a system that supports a plurality of ECC binary curves. In addition, as some ECC binary curves are defined in polynomial-basis representation, computation for these ECC binary curves requires that the system also have a binary carry-less multiplier. Conversion from normal basis to polynomial basis is slow due to the need to compute a root of the field polynomial that requires greatest common divisor (gcd) conversion and O(n) modular multiplication calculations.

A polynomial basis of a binary field $F(2^m)$ over $F_2$ is a basis of the form:

$$\{1, x, x^2, \ldots, x^{m-1}\}.$$

The field element $a_{m-1}x^{m-1}+a_{m-2}x^{m-2}+ \ldots +a_1x+a_0$ is usually denoted by the bit string $(a_{m-1} \ldots a_1a_0)$ of length m, so that:

$$F(2^m) = \{(a_{m-1} \ldots a_1a_0) : a_i \in \{0,1\}\}.$$

A normal basis of $F(2^m)$ over $F_2$ is a basis of the form:

$$\{\beta, \beta^{(2^1)}, \beta^{(2^2)}, \ldots, \beta^{(2^{m-1})}\}$$

where $\beta \in F(2^m)$.

For finite fields in normal basis each of the basis elements $\beta$, $\beta^{(2^1)}$, $\beta^{(2^2)}$ ... is related by applying the m-th power mapping.

Such a basis always exists. Given any element a $\alpha \in F(2^m)$, then:

$$\alpha = \sum_{i=0}^{m-1} a_i \beta(2^{i-1})^i, \text{ where } a_i \in \{0, 1\}.$$

This field element $\alpha$ is denoted by the binary string $(a_0a_1a_2 \ldots a_{m-1})$ of length m, so that:

$$F_{2^m} = \{(a_0a_1a_2 \ldots a_{m-1}) : a_1 \in \{0,1\}\}.$$

An embodiment of the present invention converts binary $GF(2^m)$ points from a normal basis representation to a canonical basis representation. The conversion to canonical basis representation is faster than converting from normal basis to polynomial basis. The canonical basis representation allows arithmetic computations to be performed efficiently in a binary carry-less multiplier.

FIG. 1 is a block diagram of a system 100 that includes an embodiment of a Public Key Encryption (PKE) unit 108. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

Figure 2:
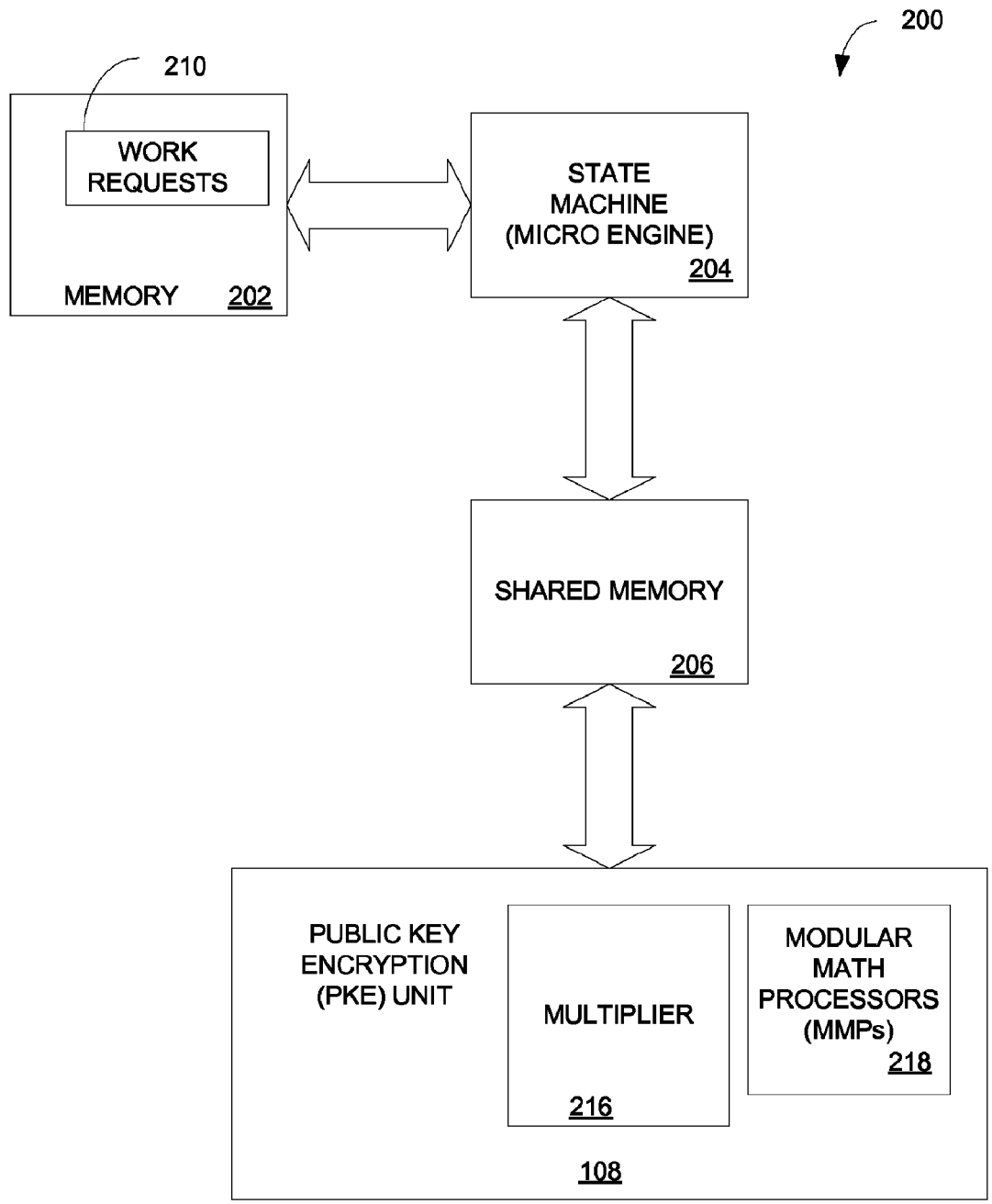
FIG. 2 is a block diagram of an embodiment of a system that includes the public key encryption (PKE) unit shown in FIG. 1.

FIG. 2 is a block diagram of an embodiment of a system 200 that includes the public key encryption (PKE) unit 108 shown in FIG. 1.

The system 200 includes a memory 202 for storing work requests 210 and a state machine (micro engine) 204 which processes the work requests 210. The state machine 204 issues instructions to the PKE unit 108 through a shared memory 206.

In one embodiment the state machine 204 may be one of a plurality of micro engines in a processor, for example, a micro engine in an IXP® 2400 processor available from Intel Corporation. The PKE unit 108 offloads computationally expensive operations from the state machine (micro engine) 204.

The memory 202 and the shared memory 206 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

Based on a work request 210 stored in memory 200, the state machine 204 may offload computationally expensive operations in Diffie-Hellman key exchange (DH), Digital Signature Algorithm (DSA) digital signature, Rivest, Shamir, Adleman (RSA) encryption/decryption and primality testing to the PKE unit 108.

The PKE unit 108 includes one or more modular math processors (MMP) 218 and multiplier 216. The PKE unit 208 may perform modular arithmetic on large numbers. An example of modular arithmetic is a modular exponential operation such as, $g^e$ mod m where g is the base, e is the exponent and m is the modulus.

Figure 3:
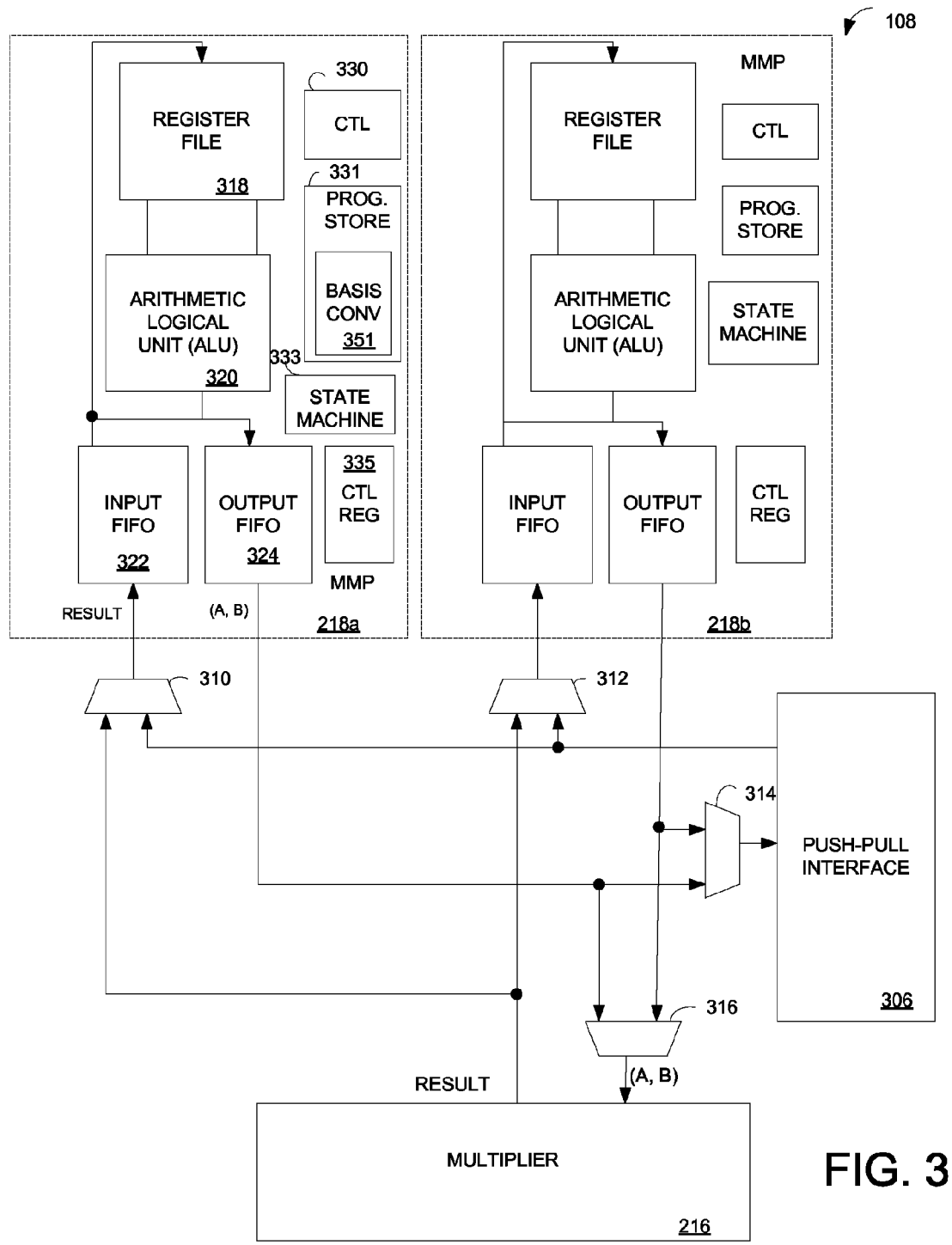
FIG. 3 is a block diagram of an embodiment of the PKE unit shown in FIG. 2 that includes basis conversion according to the principles of the present invention.

FIG. 3 is a block diagram of an embodiment of the PKE unit 108 shown in FIG. 2 that includes basis conversion 351 according to the principles of the present invention. In the embodiment shown, the PKE unit 108 includes two modular math processors (MMPs) 218a, 218b. However, the PKE unit 108 is not limited to two MMPs 218a, 218b, in other embodiments, the PKE unit 108 may have more than two MMPs.

The PKE unit 108 performs computationally expensive mathematical computations such as modular exponentiation, division and greatest common divisor (gcd). The PKE unit 108 also includes a multiplier 216, which is shared by the MMPs 218a, 218b.

Each MMP 218a, 218b includes a respective input First In First Out (FIFO) 322 and an output FIFO 324. The communication path through each MMP 218a, 218b is through the FIFOs 322, 324. Data is enqueued to the input FIFO 322 and dequeued from the output FIFO 324. The states of the MMPs 218a, 218b are independent from each other. Each MMP 218a, 218b may be concurrently transferring data to/from shared memory 206 (FIG. 2) through a push-pull interface 306.

The multiplier 216 may be accessed by the MMPs 218a, 218b via an internal PKE bus and an arbitration mechanism that includes multiplexers 310, 312, 314 and 316 and associated multiplexer control logic (not shown). As the multiplier 216 is shared by the MMPs 218a, 218b, the multiplexer control logic controls which MMP 218a, 218b is currently using the multiplier 216.

The operand size for each MMP 218a, 218b is configurable through the control logic 330, program store 331 and state machine 333. In one embodiment the operand size may be configured to be 256 or 512 bits. The type of multiply operation is also configurable. In one embodiment, the type of multiply operation performed by the multiplier 216 for a particular MMP 218a, 218b may be unsigned integer or GF2 (carry-less). Based on the configured operand size and multiply operation for a particular MMP 218a, 218b, the MPP 218a, 218b operates on the required length result vectors without explicit command encodings. For example, the control logic 330 of one of the MMPs 218a, 218b may be configured to perform scalar point multiplication for all prime field sizes less than 521 bits.

The program store 331 stores code (instructions) that includes instructions for performing a multiply operation. While one of the MMPs 218a, 218b is in a run-mode, the MMP command state-machine 333 enqueues multiply operations in the output FIFO 324 for processing by the multiplier 216, with the type of multiply operations to be performed being dependent on the code stored in the control program store.

Various programs may be loaded into each MMP's respective program store 331. For example, a program for prime-fields that performs scalar point multiplication that works efficiently for all prime ECC sizes greater than 521 bits may be loaded into the program store 331 of the MMP 218a, 218b to perform ECC operations. A program for binary/Kobitz ECC curves that performs scalar point multiplication that works efficiently for all binary ECC sizes greater or equal to 512 bits may be loaded into the program store 331 of the MMP 218a, 218b to perform ECC operations.

FIG. 1 is a block diagram of a system 100 that includes an embodiment of a Public Key Encryption (PKE) unit 108. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 110. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 110 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 120 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

FIG. 2 is a block diagram of an embodiment of a system 200 that includes the public key encryption (PKE) unit 108 shown in FIG. 1.

The system 200 includes a memory 202 for storing work requests 210 and a state machine (micro engine) 204 which processes the work requests 210. The state machine 204 issues instructions to the PKE unit 108 through a shared memory 206.

In one embodiment the state machine 204 may be one of a plurality of micro engines in a processor, for example, a micro engine in an IXP® 2400 processor available from Intel Corporation. The PKE unit 108 offloads computationally expensive operations from the state machine (micro engine) 204.

The memory 202 and the shared memory 206 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

Based on a work request 210 stored in memory 200, the state machine 204 may offload computationally expensive operations in Diffie-Hellman key exchange (DH), Digital Signature Algorithm (DSA) digital signature, Rivest, Shamir, Adleman (RSA) encryption/decryption and Elliptic Curve Cryptosystem (ECC) to the PKE unit 108.

The PKE unit 108 includes one or more modular math processors (MMP) 218 and multiplier 216. The PKE unit 208 may perform modular arithmetic on large numbers. An example of modular arithmetic is a modular exponential operation such as, $g^e$ mod m where g is the base, e is the exponent and m is the modulus.

FIG. 3 is a block diagram of an embodiment of the PKE unit 108 shown in FIG. 2 that includes basis conversion 351 according to the principles of the present invention. In the embodiment shown, the PKE unit 108 includes two modular math processors (MMPs) 218a, 218b. However, the PKE unit 108 is not limited to two MMPs 218a, 218b, in other embodiments, the PKE unit 108 may have more than two MMPs.

The PKE unit 108 performs computationally expensive mathematical computations such as modular exponentiation, division and greatest common divisor (gcd). The PKE unit 108 also includes a multiplier 216, which is shared by the MMPs 218a, 218b.

Each MMP 218a, 218b includes a respective input First In First Out (FIFO) 322 and an output FIFO 324. The communication path through each MMP 218a, 218b is through the FIFOs 322, 324. Data is enqueued to the input FIFO 322 and dequeued from the output FIFO 324. The states of the MMPs 218a, 218b are independent from each other. Each MMP 218a, 218b may be concurrently transferring data to/from shared memory 206 (FIG. 2) through a push-pull interface 306.

The multiplier 216 may be accessed by the MMPs 218a, 218b via an internal PKE bus and an arbitration mechanism that includes multiplexers 310, 312, 314 and 316 and associated multiplexer control logic (not shown). As the multiplier 216 is shared by the MMPs 218a, 218b, the multiplexer control logic controls which one of the MMPs 218a, 218b is currently using the multiplier 216.

The operand size for each MMP 218a, 218b is configurable through the control logic 330, program store 331 and state machine 333. In one embodiment the operand size may be configured to be 256 bits or 512 bits. The type of multiply operation performed by the multiplier 216 is also configurable. In one embodiment, the type of multiply operation performed by the multiplier 216 for a particular MMP 218a, 218b may be unsigned integer or GF2 (carry-less). Based on the configured operand size and multiply operation for a particular MMP 218a, 218b, the MMP 218a, 218b operates on the required length result vectors without explicit command encodings. For example, for a particular problem, the control logic 330 of one of the MMPs 218a, 218b may be configured to perform scalar point multiplication for all prime field sizes less than 521 bits.

The program store 331 stores code (instructions) that includes instructions for performing a multiply operation. While one of the MMPs 218a, 218b is in a run-mode, the MMP command state-machine 333 enqueues multiply operations in the output FIFO 324 for processing by the multiplier 216, with the type of multiply operations to be performed being dependent on the instructions stored in the control program store 331.

Various programs may be loaded into each MMP's respective program store 331. For example, a program for prime-fields that performs scalar point multiplication that works efficiently for all prime ECC sizes greater than 521 bits may be loaded into the program store 331 of the MMP 218a, 218b to perform ECC operations. A program for binary/Kobitz ECC curves that performs scalar point multiplication that works efficiently for all binary ECC sizes greater or equal to 512 bits may be loaded into the program store 331 of the MMP 218a, 218b to perform ECC operations.

Other programs that may be loaded into the program store 331 of the MMP 218a, 218b include programs for conversions from projective co-ordinate spaces to affine space for prime and binary ECC. An embodiment of basis conversion 351 according to the principles of the present invention may be loaded into the program store 331 for performing normal basis—canonical basis conversions for binary curves that are specified in normal basis.

Other programs that may be loaded into the program store 331 of the MMP 218a, 218b include programs for conversions from projective co-ordinate spaces to affine space for prime and binary ECC. An embodiment of basis conversion 351 according to the principles of the present invention may be loaded into the program store 331 for performing normal basis—polynomial basis conversions.

The single multiplier 216 that is shared by the MMPs 218a, 218b may operate in one mode with MMP 218a and another mode with MMP 218b in an interleaved fashion. For example, for a particular problem to be performed by the PKE unit 108, MMP 218a may be performing a binary ECC operation on binary field size of 233 bits, thus requiring the multiplier 216 to be configured for 256 bits, Galois Field ({256b, GF*}) mode multiplication. In GF mode, the shared multiplier 216 performs a GF carryless multiplication operation. MMP 218b may be operating on 384-bit prime field size, requiring the multiplier to be set in 512 bit, integer ({512b, int*}) mode. In integer mode, the multiplier 216 performs an integer multiply operation using unsigned integer multipliers in redundant form. The integer multiplication operation for MMP 218a and the GF carryless multiplication operation for MMP 218b are supported concurrently.

Furthermore, each MMP 218a, 218b may be configured to perform one of a plurality of reduction techniques, such as, Barrett Reduction or Montgomery Reduction to perform scalar point multiplication.

Each MMP 218a, 218b has three modes of operation controlled by the MMP state machine 333: sleep, Input/Output (I/O) and run mode. For example, when the MMP 218a is in sleep mode, MMP 218b may be initialized by loading control words into the program store 330. After the last control word is loaded into the program store 331, the MMP 218b transitions to I/O mode.

In I/O mode, data is loaded into the MMP 218a, 218b by enqueuing it in the input FIFO 322. Results may be returned through the push pull interface 306 by enqueuing (writing) them in the output FIFO 324.

When the MMP 218a, 218b is in run mode, the MMP 218a, 218b only communicates with the multiplier 216 to perform math operations. For efficient computation, one MMP 218a, 218b may be in run mode while the other MMP 218a, 218b is in I/O or sleep mode.

The initialization procedure includes enqueuing three phases of data to the MMP's input FIFO 322. The first phase is a preamble that includes configuration information. In one embodiment, 128-bits of configuration information are sent to the MMP 218a, 218b. The second phase is a control store binary to be stored in program store 331 and executed by the MMP state machine 333. The third phase is the input data for use by the stored control store binary.

When the MMP 218a, 218b is in run mode, the multiplier 216 dequeues operands from the output FIFO 324. In an embodiment, there are two operands each having 512-bits that are enqueued side-by-side in the output FIFO 324. There is also a control register 335 that stores a Hold/Release indicator (for example, a single bit) per operand that indicates whether the multiplier 216 is to continue servicing that MMP 218a, 218b or to service a different MMP 218a, 218b. Thus, the Hold/Release indicator allows the MMPs 218a, 218b to share the multiplier 216.

The control register 335 may also store carry-bits per operand and may also store an indication (for example, one bit) of the size of the multiplicand (256 or 512) and the operation type (int/GF2) per operand. Logically these appear to be part of the output FIFO 324 even though they are stored in a separate control register 335. The MMP 218a, 218b makes a function call to the multiplier 216 symbolically as:

result=MUL(A,B,extra-carry-bits,hold/release,size, operation-type)

with the operands A, B stored in the output FIFO 324 and the extra-carry-bits, hold/release, size and operation-type indicators stored in the control register 335 and read by the multiplier 216. In an embodiment, the control register 335 may be written by the corresponding MMP 218a, 218b each time the MMP 218a, 218b queues a problem for the multiplier 216. The multiplier 216 reads the control register 335 when it pulls the operands from the output FIFO 324.

In an embodiment, the multiplier 216 is a 515 by 515 multiplier with a throughput of one multiply operation per sixteen cycles (that is, 512 bits, 32 bits at a time). The multiplier 216 includes an arbiter which allows requests to perform a multiply operation on operands (A,B) received from a single MMP 218a, 218b as long as the hold/release indicator in the control register 335 associated with each set of operands is set to hold. After an MMP 218a, 218b changes the hold/release indicator to release, the arbiter may choose another MMP 218a, 218b to service in round robin fashion. The multiplier may operate on 256-bit operands. However, as the multiplier always performs a fixed size multiply, this requires padding of the 256 Most Significant Bits (MSBs) of the 512-bit operands with zeros.

In an embodiment, the MMP 218a, 218b is a 64-bit vector processor which is optimized to perform operations on arbitrarily large integers in the range of 64 to 4096-bits. The MMP 218a, 218b uses instruction words which are either sixteen or thirty-two bits long. In an embodiment, the register file 318 has two 2 kilo Bytes (kB) data memory (for example, Random Access Memory (RAM)) for storing operands (A and B bank) and a 1 kB control store memory. The input FIFO 322 and the output FIFO 324 each are 0.25 kB. The MMP 218a, 218b also includes a general purpose arithmetic logical unit (ALU) 320.

Figure 4:
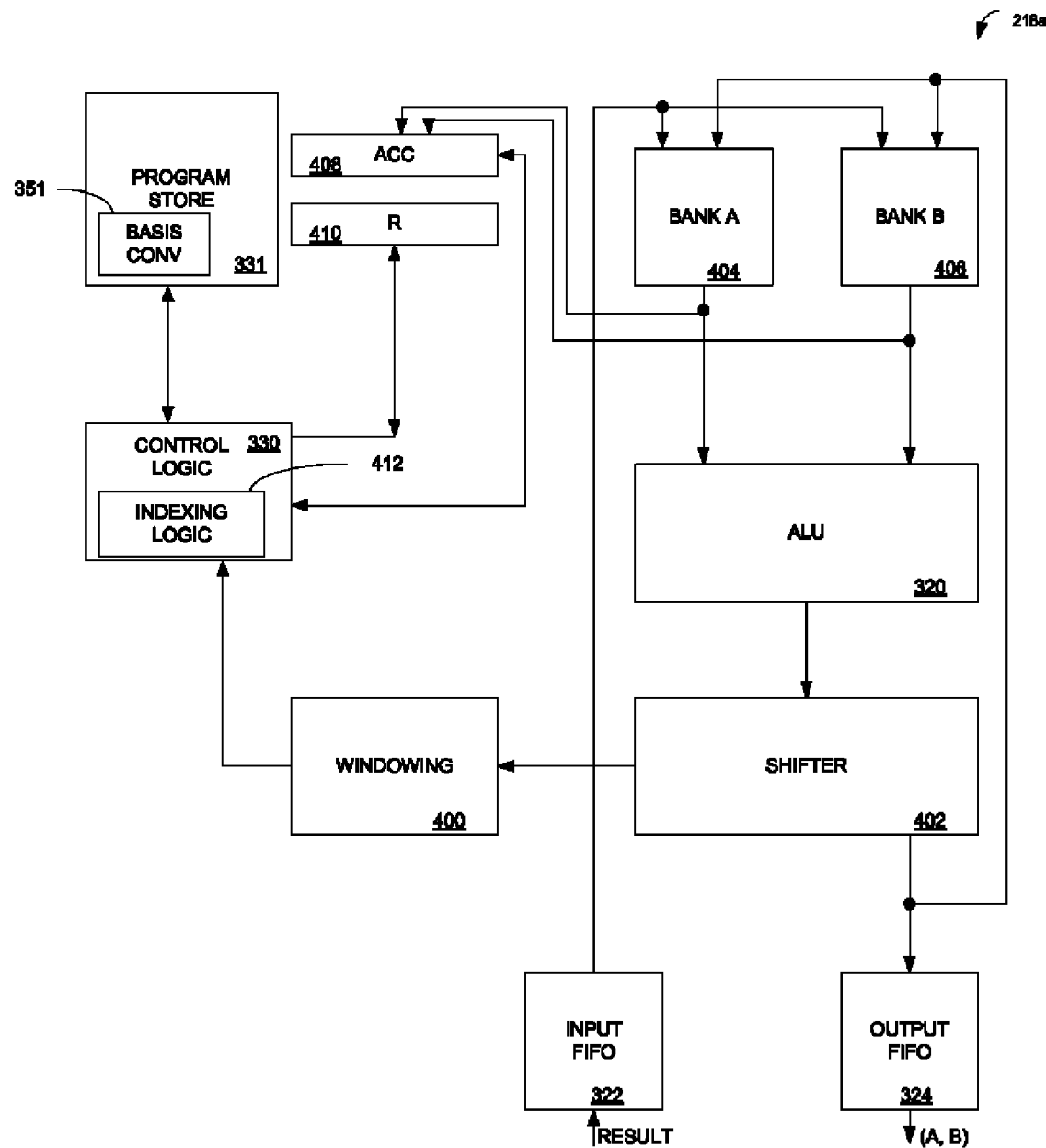
FIG. 4 is a block diagram of an embodiment of any one of the Modular Math Processors (MMPs) shown in FIG. 3.

FIG. 4 is a block diagram of an embodiment of any one of the modular math processors (MMPs) 218a, 218b shown in FIG. 3. As shown, the MMP 218a includes an arithmetic logic unit 320 that performs operations such as addition, subtraction, and logical operations such as Boolean AND-ing and OR-ing of vectors. The arithmetic logic unit 320 is coupled to, and can operate on, operands stored in a memory divided into a pair of data banks 404, 406 with each data bank 404, 406 independently coupled to the arithmetic logic unit 320. The arithmetic logic unit 320 is also coupled to and can operate on operands stored in input FIFO 322 that may be received from the multiplier 216 or push-pull interface 306. The size of operands used by the arithmetic logic unit 320 to perform a given operation can vary and can be specified by program instructions stored in the program store 331.

As shown, the arithmetic logic unit 320 may be coupled to a shifter 402 that can programmatically shift the output received from the arithmetic logic unit 320. The output of the arithmetic logic unit 320/shifter 402 can be "re-circulated" back into data bank 404, 406. Alternately, or in addition, results of the arithmetic logic unit 320/shifter 402 can be written to an output FIFO 324. The output FIFO 324 can store respective sets of multiplication operands to be sent to the multiplier 216 or can store the final results of program execution to be transferred through the push-pull interface 306.

The components described above form a cyclic datapath. That is, operands flow from the input FIFO 322, data banks 404, 406 through the arithmetic logic unit 320 and either back into the data banks 404, 406 or to the output FIFO 324. Operation of the datapath is controlled by program instructions stored in program store 331 and executed by control logic 330. The control logic 330 can access data stored in data banks 404, 406 through indexing logic 412 based on input received from windowing logic 400. The control logic 330 may also access (read/write) an accumulator (acc) register 408 and an another register labeled R 410 that are used to store intermediate values used by basis conversion 351 to perform basis conversion of a normal basis representation to a normal basis representation according to the principles of the present invention.

Figure 5:
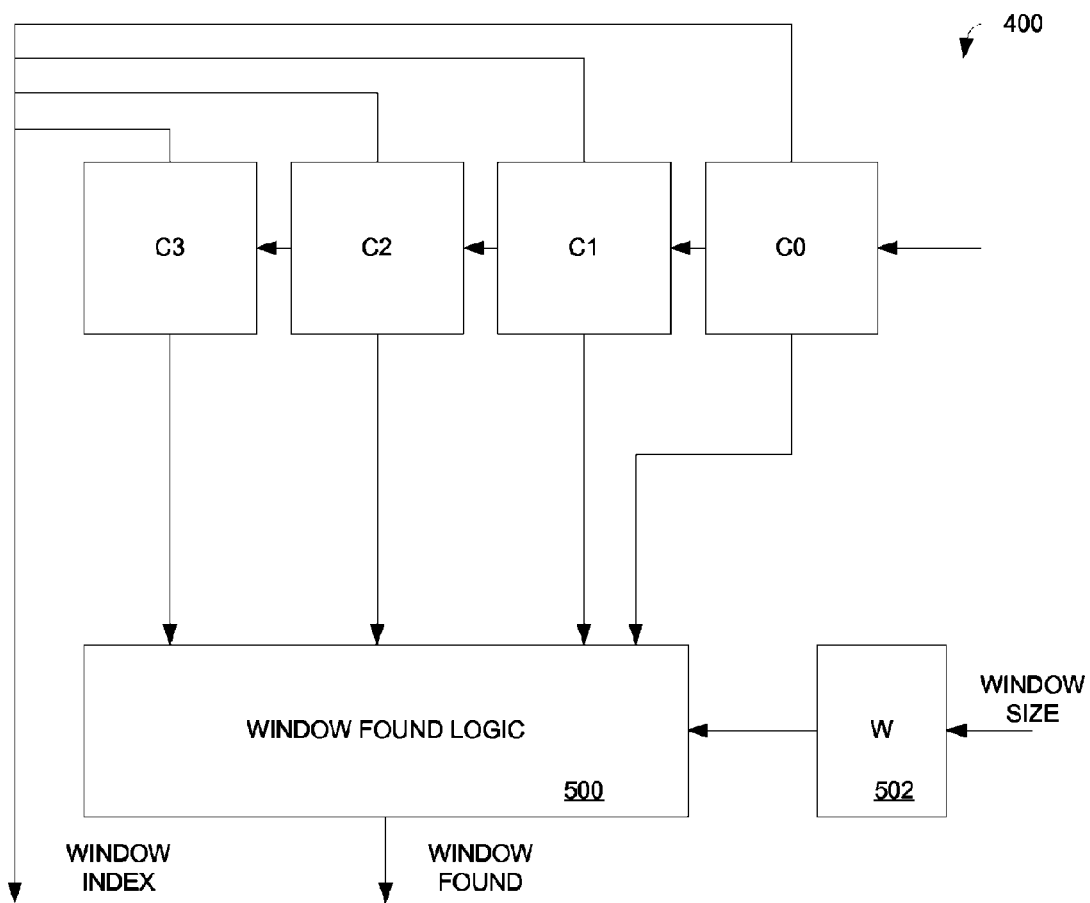
FIG. 5 is a block diagram of an embodiment of the windowing logic shown in FIG. 4.

FIG. 5 is a block diagram of an embodiment of the windowing logic 400 shown in FIG. 4 to provide a sliding window scheme. As shown, the windowing logic 210 includes a set of register bits (labeled C3 to C0) to perform a left shift operation to enable the windowing logic 400 to access M-bits of a bit string at a time as the bits stream through the windowing logic 400. Based on the register bits and a programmable identification of a window size 502, the windowing logic 400 can identify the location of a window-size pattern of non-zero bits (for example, 1101) within the bit string. By searching within a set of bits larger than the window-size, the windowing logic 400 can identify windows irrespective of location within the bit string.

Upon finding a window of non-zero bits, the windowing logic 400 indicates that a window has been found through a "window found" signal that identifies the index of the window within the bit string. The windowing logic 400 may also output the pattern of non-zero bits found. In an embodiment, a 4-bit pattern is used to identify one of eight 64-bit segments of a 512-bit bit string that is stored in one of the memory banks 404, 406.

The windowing logic 400 receives the output of the shifter 402 which rotates bits of the bit string through the windowing logic 400. The windowing logic 400 is also coupled to control logic 330. The control logic 330 controls operation of the windowing logic 400 (for example, to set the window size and/or select fixed or sliding window operation) and to respond to windowing logic 400 output. For example, the control logic 330 can include a conditional branching instruction that operates on "window found" output of the control logic 330. On a window found condition the control logic 330 may use the output index to select one of eight 64-bit words of a 512 bit string stored in bank A 404 or bank B 406.

Thus, in an embodiment the windowing logic 400 may be used to convert a 512-bit bit string in normal basis that is stored in bank A 404 in LSB to MSB order to a bit string in canonical basis that is stored in bank B 406 in MSB to LSB order. The conversion is performed on the fly through the windowing logic 400 without the need for a storing a sparsely populated (that is, based on the number of bits in the array that are set to '1') 512×512 bit array.

Figure 6:
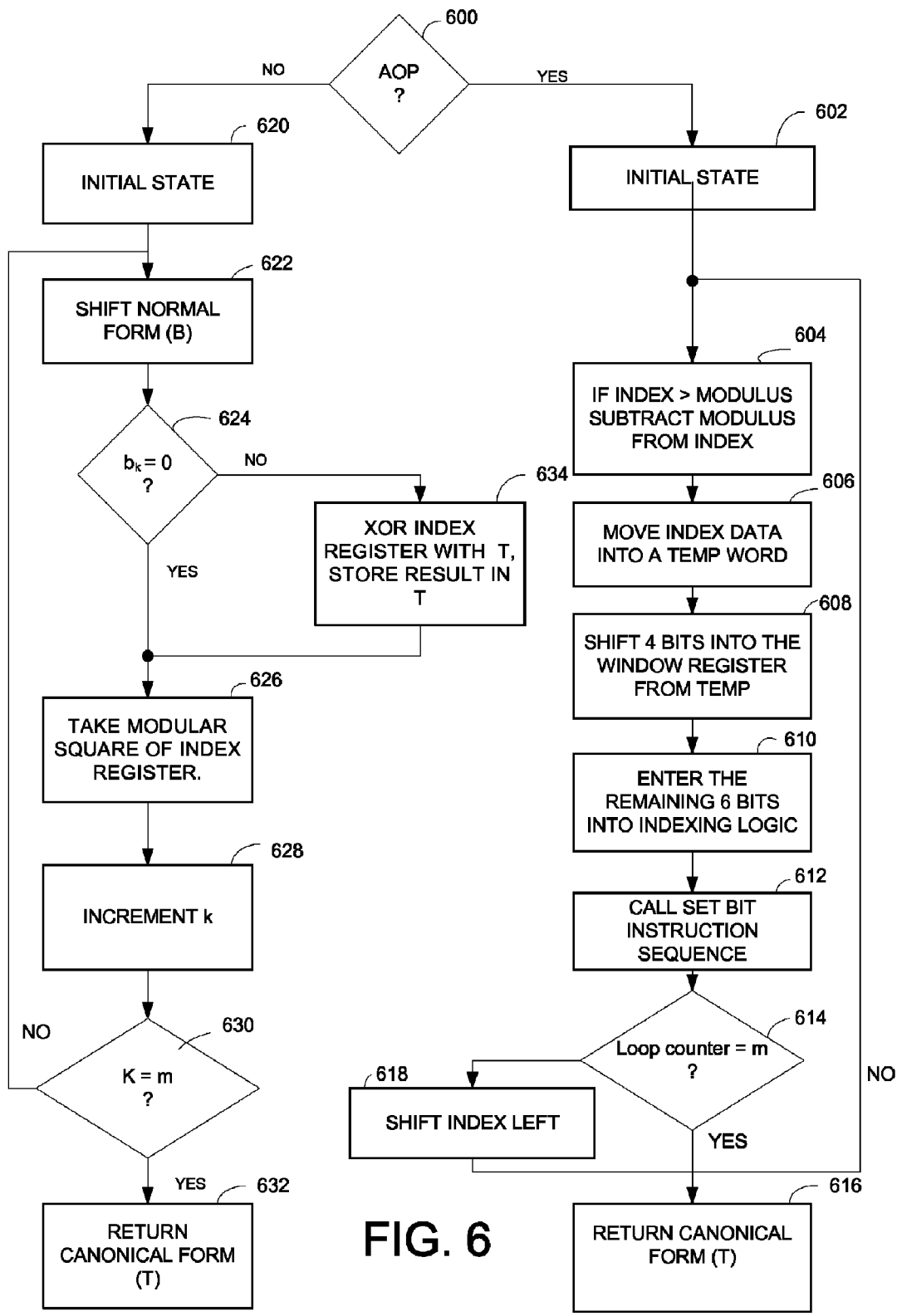
FIG. 6 is a flow graph of an embodiment of basis conversion for computing canonical basis given normal-basis according to the principles of the present invention.

FIG. 6 is a flow graph of an embodiment of basis conversion 351 for computing canonical basis given normal-basis according to the principles of the present invention.

When an operand (A) is received in a normal basis representation, basis conversion 351 converts the normal basis representation to a canonical basis representation (B). The canonical basis representation may then be operated on by a generic polynomial basis multiplier, such as multiplier 216.

The polynomial may be a generic irreducible polynomial or a special form of irreducible polynomial of the form "all-ones" referred to as all-one-polynomial (AOP).

A normal basis of F(2m) over $F_2$ is a basis of the form:

$$\{\beta, \beta(2^1), \beta(2^2), \ldots, \beta(2^{m-1})\}$$

where $\beta \in F(2^m)$.

In normal basis representation, if the generator polynomial of the field $GF(2^m)$ is an AOP, then $\beta^{m+1}=1$ and the normal basis in canonical form is $\{\beta, \beta^2, \beta^3, \ldots, \beta^m\}$.

At block 600, if the polynomial is an AOP, processing continues with block 602.

At block 602, as the polynomial is an AOP, the property $\beta^{m+1}=1$ is used to represent the normal basis in canonical form $\{\beta, \beta^2, \beta^3, \ldots, \beta^m\}$. The equation $\beta^{2 \text{ to the power of } k} = \beta^{(2 \text{ to the power of } (k \bmod (m+1)))}$ satisfies the conversion. As the canonical form is similar to the polynomial form, polynomial basis arithmetic may be used on the canonical form.

A 10-bit value stored in an index register is initialized to '0000000001' for a curve length m of 512-bits. Then, the index register is scaled to 512 bits by adding 0s to the Least Significant Bits (LSBs) resulting in an index value of '0000000001 . . . 000'. An index modulus is initialized to 'm+1 . . . 00 . . . 000'. The index register and the index modulus may be stored in a data bank 404, 406. Processing continues with block 604.

At block 604, if the index value that is stored in the index register is greater than the value stored in the index modulus register, the modulus value (m) is subtracted from the index value index. For example, if modulus value m is 5, $\beta^6$ maps to $\beta^1$ because property index value $\beta^{m+1}=1$, that is computed by subtracting modulus (5) form index value (6). Processing continues with block 606.

At block 606, the 10-bit index data from the MSBs of the index is moved into a temporary register in order to save the current state. Processing continues with block 608.

At block 608, the 4 Most Significant Bits (MSBs) of the 10-bit index value stored in the temporary register are shifted into windowing logic 400. Processing continues with block 610.

At block 610, the lower order 6-bits of the 10-bit index value that is stored in the temporary register are forwarded to indexing logic 412. Processing continues with block 612.

At block 612, A is shifted left by one bit. Next, the 4-bits of data stored in the window register are used as an offset to a pointer to a 64-bit word stored in one of the data banks 404, 406. The other 6-bits of data in the indexing logic 412 are used as an index to bits in the 64-bit word by the windowing logic 400. Then the shift_carry data from the shifter 402 is moved to the corresponding bit position in the other data bank 404, 40. Next, the index word is left shifted by one bit. If the result is greater than or equal to index modulus word, the index modulus is subtracted from index. Finally, a loop counter is incremented. Processing continues with block 614.

At block 614, if the loop counter is equal to m, processing continues with block 616. If not, processing continues with block 618 to continue to perform the conversion.

At block 616, conversion from normal basis to canonical basis is complete. The canonical form stored in B is returned.

At block 618, the value stored in the index register is shifted left by one bit. Processing continues with block 606.

At block 620, the polynomials are generic. Thus, the rule $\beta^{m+1}=1$ does not apply. Instead, the following rule is used to implement basis conversions:

$$\text{Generator polynomial } p(x) = \sum_{i=0}^{m-1} a_i x^i$$

$$p(\beta) = \sum_{i=0}^{m-1} a_i \beta^i \equiv 0 \pmod{p(x)}$$

$$\beta^{m-1} \equiv \sum_{i=0}^{m-2} a_i \beta^i \pmod{p(x)}, \text{ that is, modulus } M$$

Any $\beta^{2\text{ to the power of }k}$ may be calculated using the above rule. The input B having a sequence $(b_0, b_1, b_2, \ldots, b_{m-1})$ (normal form) is transformed into an output T having a sequence $(t_{m-1}, \ldots t_1, t_0)$ (canonical form). The index register is initialized to 1, that is, an index value of '00 . . . 010'. The output T is initialized to b0, k is initialized to 0 and a modulus is set to M. Processing continues with block 622.

At block 622, the input B is shifted left by one bit to get the next bit because the bit string B is processed from Most Significant Bit (MSB) to Least Significant Bit (LSB). Processing continues with block 624.

At block 624, if $b_k$ is 0, there is no bit to set in the output, so processing continues with block 626. If $b_k$ is 1, processing continues with block 634.

At block 626, $b_k$ is 0, the modular square of the index register is taken, that is, the index register is multiplied by 2 by shifting the value left by one bit and then the modulus is subtracted from the result. Processing continues with block 628.

At block 628, the loop counter k is incremented. Processing continues with block 630.

At block 630, if k is less than m, there are more bits in B to be processed and processing continues with block 622. If k is equal to m, the conversion to canonical form is complete and processing continues with block 634.

At block 632, the canonical form T is returned.

At block 634, as $b_k$ is 1, the index register is exclusive ORed with T. The exclusive OR operation is used because multiple locations in B may map to the same location in A. The result is stored in T. Processing continues with block 626.

An embodiment of basis conversion provides a fast conversion operation for AOP polynomials and provides good performance for generic polynomials. As the conversion is performed on the fly, a large memory is avoided for storing large matrices (for example, a 512×512 matrix) and the conversion may be performed for large fields (up to 512 bits). For AOP polynomials, the vector set-bit instruction uses windowing logic 400 in the MMP 218a, 218b to index into the input word (for example, A) and the six Most Significant Bits (MSBs) of another word to index into the required bit position. Also, the index variables are left-justified to improve efficiency of other operations, for example, checking for carry. The basis conversion has the most benefit for ECC, but is also applicable to other public-key protocols.

After mathematical operations have been computed by the ALU 320 and/or multiplier 216 using canonical form, the polynomial-basis result needs to be converted back to normal-basis prior to forwarding the result through the push-pull interface 306.

Figure 7:
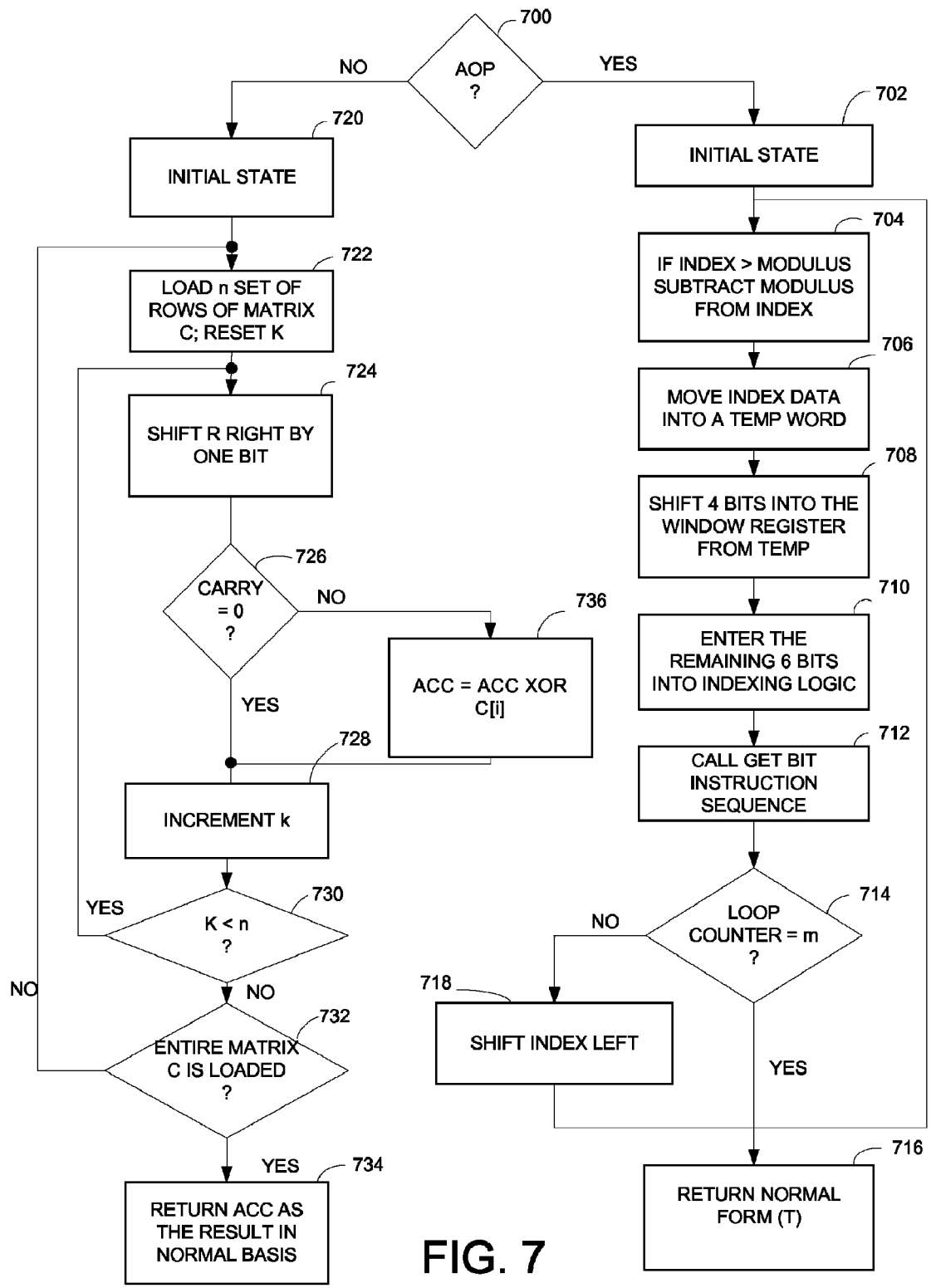
FIG. 7 is a flow graph of an embodiment of basis conversion for computing normal basis given polynomial-basis.

FIG. 7 is a flow graph of an embodiment of basis conversion for computing normal basis given polynomial-basis.

When an operand (A) is received in a normal basis representation, basis conversion 351 converts the normal basis representation to a polynomial/canonical basis representation (B).

The conversion of the operand (number) from polynomial basis to normal basis involves shuffling bits inside the number. In order to support up to 512-bit fields, a 512*512 bit size matrix is required. In order to avoid the need to provide a 512*512 bit memory array that would be sparsely populated, the matrix is computed on-the-fly during the conversion.

The polynomial in normal basis representation may be a generic irreducible polynomial or a special form of irreducible polynomial of the form "all-ones" referred to as all-one-polynomial (AOP).

A normal basis of $F(2^m)$ over $F_2$ is a basis of the form:

$$\{\beta, \beta^{(2^1)}, \beta^{(2^2)}, \ldots, \beta^{(2^{m-1})}\}$$

where $\beta \in F(2^m)$.

In normal basis representation, if the generator polynomial of the field $GF(2^m)$ is an $\beta^{m+1}=1$ and the normal basis in canonical form is $\{\beta, \beta^2, \beta^3, \ldots, \beta^m\}$.

At block 700, if the polynomial is an AOP, processing continues with block 702.

At block 702, as the polynomial is an AOP, the property $\beta^{m+1}=1$ is used to represent the normal basis in canonical form $\{\beta, \beta^2, \beta^3, \ldots, \beta^m\}$. The equation $\beta^{2\text{ to the power of }k} = \beta^{(2\text{ to the power of }(k \bmod (m+1)))}$ satisfies the conversion. As the canonical form is similar to the polynomial form (that is, bit are evaluated from right to left), polynomial basis arithmetic may be used on the canonical form.

A 10-bit value stored in an index register is initialized to '0000000001' for a curve length m of 512-bits. Then, the index register is scaled to 512 bits by adding 0s to the Least Significant Bits (LSBs) resulting in an index value of '0000000001 . . . 000'. An index modulus is initialized to 'm+1 . . . 00 . . . 000'. Processing continues with block 704.

At block 704, if the index value that is stored in the index register is greater than the value stored in the index modulus register, the modulus value (m) is subtracted from the index value index. For example, if modulus value m is 5, $\beta^6$ maps to $\beta^1$ because property index value $\beta^{m+1}=1$, that is computed by subtracting modulus (5) form index value (6). Processing continues with block 706.

At block 706 the 10-bit index data from the MSBs of the index is moved into a temporary register to save the current state. Processing continues with block 708.

At block 708, the 4 Most Significant Bits (MSBs) of the 10-bit index value stored in the temporary register are shifted through shifter 402 into windowing logic 400. Processing continues with block 710.

At block 710, the lower order 6-bits of the 10-bit index value that is stored in the temporary register are forwarded to indexing logic 412. Processing continues with block 712.

At block 712, a get_bit instruction is called with a pointer to the polynomial basis operand A. The get_bit instruction uses the 4-bits of data stored in the window logic 400 as an offset to a pointer to a 64-bit word stored in bank A 404 or bank B 406. The other 6-bits of data in the indexing logic 412 are used as an index to bits in the 64-bit word pointed by the windowing logic 400. Then the get_bit instruction moves data in the corresponding bit position in A to the shift_carry bit position. B is left shifted with the output of the get_bit command as the input shift carry. Next, the index word is left shifted by one bit. If the result is greater than or equal to index modulus word, the index modulus is subtracted from index. Finally, a loop counter is incremented. Processing continues with block 714.

At block 714, if the loop counter is equal to m, processing continues with block 716. If not, processing continues with block 704 to continue to perform the conversion.

At block 716, conversion from polynomial basis to normal basis is complete. The normal basis representation stored in B is returned.

At block 718, the value stored in the index register is shifted left by one bit. Processing continues with block 704.

At block 720, the polynomials are generic. Thus, the rule $\beta^{m+1}=1$ does not apply. Instead, the following rule is used to implement basis conversions:

$$\text{Generator polynomial } p(x) = \sum_{i=0}^{m-1} a_i x^i$$

$$p(\beta) = \sum_{i=0}^{m-1} a_i \beta^i \equiv 0 \,(\text{mod } p(x))$$

The MMP 218a, 218b includes a 512-bit register R 410 and a 512-bit accumulator (ACC) register 408. Register R 410 is loaded with the polynomial-basis/canonical-basis binary field element and the ACC register 408 is zeroed. Processing continues with block 722.

At block 722, for generic polynomials, a matrix that represents the coefficients ($c_{i,j}$) of the equations is computed as follows:

```
for i =0 through (m−1){
    β^i = c_{i,0}*β^1 + ... c_{i,j}*β^{2^j} ... + c_{i,m-1}*β^{2^(m-1)}
}
```

In an embodiment, the matrix C(m*m) can be pre-computed by a host-processor and specified as part of the ECC domain parameters. As the MMP 218a, 218b does not include sufficient memory to store the entire matrix, only n set of rows of the matrix C is stored in memory bank A 404 or bank B 406 at one time. After n rows have been processed, a next n set of rows of matrix C may be loaded through the push-pull interface 306.

In one embodiment, with 256-bit fields (m=256), the first half of the rows of the matrix C may be stored in one of memory bank A 404 or bank B 406. A bit-count variable k is reset (set to '0'). Processing continues with block 724.

At block 724, R is shifted right by one bit from the Least Significant Bit (LSB) into a carry register which is accessible by the control logic 330. Processing continues with block 726.

At block 726, if the LSB of R (carry) is 0, the LSB is ignored and processing continues with block 728. If the LSB shifted from R (carry) is 1, processing continues with block 734.

At block 728, the bit count k is incremented. Processing continues with block 730.

At block 730, if k is less than the number of rows (n) that have been loaded into the MMP 218a, 218, there is another row in the n SET of rows to be processed and processing continues with block 724. For example, in an embodiment of a 512-bit×512-bit matrix, each row has 512-bits and there are 512 rows to be processed. If not, all of the n SET of rows has been processed, processing continues with block 732.

At block 732, if there are more 512-bit rows in the matrix C to be loaded and processed processing continues with block 722. If all rows in the matrix C have been processed, the conversion to normal form is complete and processing continues with block 732.

At block 734, the value stored in the ACC register 408 is returned as the result in normal basis.

At block 736, the carry is 1, the contents of the ACC register 408 is XORed with row C[k] stored in one of banks 404, 406. Processing continues with block 728 to process the next row in the matrix C.

An embodiment of basis conversion provides a fast conversion operation for AOP polynomials and provides good performance for generic polynomials. As the conversion is performed on the fly, a large memory is avoided for storing large matrices and the conversion may be performed for large fields (up to 512 bits). For AOP polynomials, the get-bit instruction uses windowing logic 400 in the MMP 218a, 218b to index into the input word (for example, A) and the six Most Significant Bits (MSBs) of another word to index into the required bit position. Also, the index variables are left-justified to improve efficiency of other operations, for example, checking for carry. The basis conversion has the most benefit for ECC, but is also applicable to other public-key protocols.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:

a memory to store a first value represented in normal-basis and to store a second value represented in canonical-basis form; and a processor including a state machine and a program store, the state machine to execute a basis conversion program stored in the program store to convert the first value to the second value, upon determining the first value represented in normal-basis is in an irreducible polynomial of the form "all ones", to select a bit of the first value, compute an index to select a bit of the second value to be modified, use a first portion of the index as a pointer to select a multi-bit portion of the second value, use a second portion of the index to select a bit in the selected multi-bit portion and copy the selected bit of the first value to the selected bit in the selected multi-bit portion.

2. The apparatus of claim 1, wherein upon determining the first value represented in normal-basis is a generic irreducible polynomial, to initialize the second value to zero and to copy a selected bit in the second value based on the value of a bit in the first value such that the value of a most significant bit in the second value is dependent on the value of a least significant bit in the first value.

3. The apparatus of claim 1, wherein the first portion of the index is 4, the second portion of the index is 6 and the multi-bit portion is 64.

4. The apparatus of claim 1, wherein the first value and the second value have 512-bits.

5. The apparatus of claim 1, wherein the index is left justified.

6. A method comprising:

providing an apparatus comprising a memory and a processor, the memory having a first value represented in normal-basis stored thereon and configured to store a second value represented in canonical basis form;

upon determining that the first value represented in normal-basis is in an irreducible polynomial of the form "all ones", converting the first value to the second value with the processor by:

selecting a bit of the first value;

computing an index to select a bit of the second value to be modified;

using a first portion of the index as a pointer to select a multi-bit portion of the second value;

using a second portion of the index to select a bit in the selected multi-bit portion; and copying the selected bit of the first value to the selected bit in the selected multi-bit portion.

7. The method of claim 6, further comprising:

upon determining the first value represented in normal-basis is a generic irreducible polynomial, initializing the second value to zero; and copying a selected bit in the second value based on the value of a bit in the first value such that the value of a most significant bit in the second value is dependent on the value of a least significant bit in the first value.

8. The method of claim 6, wherein the first portion of the index is 4, the second portion of the index is 6 and the multi-bit portion is 64.

9. The method of claim 6, wherein the first value and the second value have 512-bits.

10. The method of claim 6, wherein the index is left justified.

* * * * *